US011586384B2

(12) United States Patent
Venugopal et al.

(10) Patent No.: US 11,586,384 B2
(45) Date of Patent: Feb. 21, 2023

(54) OVERHEAD REDUCTION IN DATA TRANSFER PROTOCOL FOR DATA STORAGE DEVICES

(71) Applicant: Western Digital Technologies, Inc., San Jose, CA (US)

(72) Inventors: Abhinandan Venugopal, Bengaluru (IN); Amit Sharma, Bengaluru (IN); Vijay Chinchole, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/176,813

(22) Filed: Feb. 16, 2021

(65) Prior Publication Data
US 2022/0261181 A1    Aug. 18, 2022

(51) Int. Cl.
 *G06F 3/06* (2006.01)
(52) U.S. Cl.
 CPC .......... *G06F 3/0659* (2013.01); *G06F 3/0611* (2013.01); *G06F 3/0644* (2013.01); *G06F 3/0679* (2013.01); *G06F 2212/7206* (2013.01)
(58) Field of Classification Search
 CPC .... G06F 3/0659; G06F 3/0611; G06F 3/0644; G06F 3/0679; G06F 2212/7206
 See application file for complete search history.

(56) References Cited

U.S. PATENT DOCUMENTS

| | | | |
|---|---|---|---|
| 8,285,917 B2 | 10/2012 | Jullien et al. | |
| 9,442,662 B2 | 9/2016 | Dancho et al. | |
| 9,524,799 B2 | 12/2016 | Desireddi et al. | |
| 9,626,312 B2* | 4/2017 | Frid | G06F 3/061 |
| 9,627,082 B2 | 4/2017 | Jigour et al. | |
| 9,734,911 B2 | 8/2017 | Sinclair et al. | |
| 10,268,387 B2 | 4/2019 | Cr et al. | |
| 10,325,664 B2 | 6/2019 | Tokutomi et al. | |
| 2009/0290433 A1 | 11/2009 | Park | |
| 2018/0277180 A1 | 9/2018 | Yoshida | |
| 2018/0301188 A1 | 10/2018 | Choi et al. | |

(Continued)

OTHER PUBLICATIONS

Q. Luo, R. C. C. Cheung and Y. Sun, "Dynamic Virtual Page-Based Flash Translation Layer With Novel Hot Data Identification and Adaptive Parallelism Management," in IEEE Access, vol. 6, pp. 56200-56213, 2018, doi: 10.1109/ACCESS.2018.2872721. (Year: 2018).*

*Primary Examiner* — Kalpit Parikh
(74) *Attorney, Agent, or Firm* — Michael Best & Friedrich LLP

(57) ABSTRACT

The disclosure provides data storage devices, methods, and apparatuses including, among other things, a NAND feature through which software may define logical die groups. Moreover, these logical die groups are indexed and operated with indexed single commands, which is selective-multi-casting to specific dies. In one implementation, a data storage device includes a NAND memory and a controller. The NAND memory including a plurality of dies. The controller is coupled to the NAND memory and configured to generate an index by assigning each die of the plurality of dies to one logical group of a plurality of logical groups, and create the plurality of logical groups in the NAND memory by sending one or more command sequences to the NAND memory that groups the plurality of dies into the plurality of logical groups based on the index that is generated.

20 Claims, 7 Drawing Sheets

(56) References Cited

U.S. PATENT DOCUMENTS

| | | |
|---|---|---|
| 2019/0102110 A1 | 4/2019 | Shaharabany et al. |
| 2019/0237117 A1 | 8/2019 | Polney |
| 2020/0004443 A1 | 1/2020 | Secatch et al. |
| 2020/0159418 A1 | 5/2020 | Liu et al. |
| 2021/0191850 A1* | 6/2021 | Subbarao ............ G06F 12/0873 |
| 2021/0365369 A1 | 11/2021 | Shin et al. |

* cited by examiner

OVERHEAD REDUCTION IN DATA TRANSFER PROTOCOL FOR DATA STORAGE DEVICES

BACKGROUND

This application relates generally to data storage devices, and more particularly, to a data storage device including a controller and NAND memory that reduce software overhead bottlenecks.

Storage capacity of data storage devices across segments (e.g., SSDs, microSD cards, and USB drives) is continually increasing over time, which means the number of dies inside these data storage devices is also continually increasing over time. To achieve maximum performance, the dies are ideally working in parallel to each other. However, the software controlling these data storage devices takes a certain amount of time (referred to herein as "software overhead") to issue an operation (e.g., a read operation or a write operation) for each die.

SUMMARY

Software schemes perform logical die grouping as per physical properties like speed variation, health, error rate to effectively utilize dies with similar properties and achieve optimal system performance. Further, NAND supports unicast commands to interact with individual dies and broadcast commands to interact with all dies in a chip. However, in a system with logical die grouping (especially when die grouping is discontinuous), the software has to instruct the processor to issue unicast commands and interact/send sequences with each die independently. The unicast commands result in more software overheads and an overall reduction in performance of the data storage device.

The present disclosure provides data storage devices, methods, and apparatuses including, among other things, a NAND feature through which the software may define logical die groups (also referred to as "logical groups"). Moreover, these logical die groups are indexed and operated with indexed single commands, which is selective-multicasting to dies.

For example, the disclosure provides a data storage device. In one implementation, the data storage device includes a NAND memory and a controller. The NAND memory includes a plurality of dies. The controller is coupled to the NAND memory and is configured to generate an index by assigning each die of the plurality of dies to one logical group of a plurality of logical groups. The controller is also configured to create the plurality of logical groups in the NAND memory by sending one or more command sequences to the NAND memory that groups the plurality of dies into the plurality of logical groups based on the index that is generated.

The present disclosure also provides a method including generating, with a controller, an index by assigning each die of a plurality of dies of a NAND memory to one logical group of a plurality of logical groups. The method also includes creating, with the controller, the plurality of logical groups in the NAND memory by sending one or more command sequences to the NAND memory that groups the plurality of dies into the plurality of logical groups based on the index that is generated.

The present disclosure further provides an apparatus including means for generating an index by assigning each die of a plurality of dies of a NAND memory to one logical group of a plurality of logical groups. The apparatus also including means for creating the plurality of logical groups in the NAND memory by sending one or more command sequences to the NAND memory that groups the plurality of dies into the plurality of logical groups based on the index that is generated.

Various aspects of the present disclosure provide for improvements in data storage devices. The present disclosure can be embodied in various forms, including hardware or circuits controlled by software and/or firmware. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller and NAND may be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND memory, the concepts discussed herein are applicable to other types of solid-state memory, such as NOR, PCM (Phase Change Memory), ReRAM, or other solid-state memory.

Figure 1:
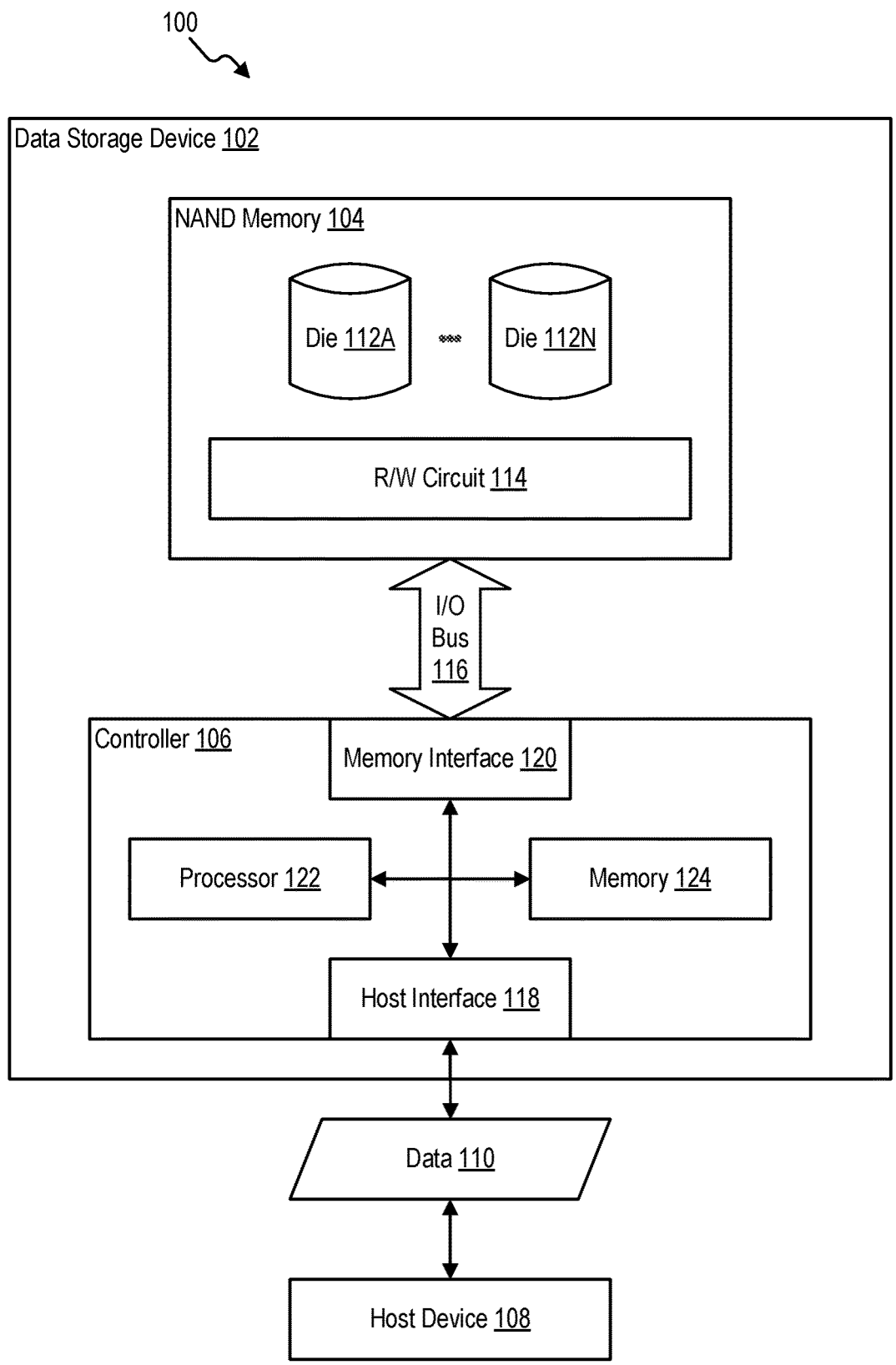
FIG. 1 is block diagram of one example of a system that includes a data storage device, in accordance with some implementations of the present disclosure.

FIG. 1 is block diagram of one example of a system 100 that includes a data storage device 102, in accordance with some implementations of the present disclosure. In some implementations, the data storage device 102 is a flash memory device. For example, the data storage device 102 is a Secure Digital SD® card, a microSD® card, or another similar type of data storage device. The data storage device 102 illustrated in FIG. 1 includes a NAND memory 104 and a controller 106. The data storage device 102 is coupled to a host device 108. The host device 108 is configured to provide data 110 (for example, user data) to the data storage device 102 to be stored, for example, in the NAND memory 104. The host device 108 is also configured to request data 110 to be read from the NAND memory 104. The host device 108 is, for example, a smart phone, a music player, a video player, a gaming console, an e-book reader, a personal digital assistance, a tablet, a notebook computer, or another similar device.

The NAND memory 104 illustrated in FIG. 1 includes a plurality of dies 112A-112N (for example, NAND dies) and a read/write circuit 114. The read/write circuit 114 is configured to support operation of the plurality of dies 112A-112N of the NAND memory 104. Although depicted as a single component in FIG. 1, the read/write circuit 114 may be divided into separate components of the NAND memory 104, such as a read circuit and a write circuit. The read/write circuit 114 may be external to the plurality of dies 112A-112N of the NAND memory 104. Alternatively, one or more of the plurality of dies 112A-112N of the NAND memory 104 may include corresponding read/write circuitry that is operable to read data from and/or write data to storage elements within the individual die independent of any other read and/or write operations at any of the other dies. The NAND memory 104 is communicable coupled to the controller 106 via an input/output ("I/O") bus 116.

The controller 106 illustrated in FIG. 1 includes a host interface 118, a memory interface 120, a processor 122 (for example, a microprocessor, a microcontroller, a field-programmable gate array ["FPGA"] semiconductor, an application specific integrated circuit ["ASIC"], or another suitable programmable device), and a memory 124 (for example, a random access memory ["RAM"], a read-only memory ["ROM"], a non-transitory computer readable medium, or a combination thereof). The controller 106 is illustrated in FIG. 1 in a simplified form. One skilled in the art would recognize that a controller for a NAND memory may include additional modules or components other than those specifically illustrated in FIG. 1. Additionally, although the data storage device 102 is illustrated in FIG. 1 as including the controller 106, in other implementations, the controller 106 is instead located within the host device 108 or is otherwise separate from the data storage device 102. As a result, operations that would normally be performed by the controller 106 (for example, wear leveling, bad block management, data scrambling, garbage collection, address mapping, etc.) may be performed by the host device 108 or another device that connects to the data storage device 102.

The controller 106 is configured to send data to, and receive data and instructions from, the host device 108 via the host interface 118. The host interface 118 enables the host device 108 to, for example, read from the NAND memory 104 and to write to the NAND memory 104 using any suitable communication protocol. Suitable communication protocols include, for example, the Universal Flash Storage ("UFS") Host Controller Interface specification, the Secure Digital ("SD") Host Controller specification, etc.

The controller 106 is also configured to send data and commands to, and receive data from, the NAND memory 104 via the memory interface 120. As an illustrative example, the controller 106 is configured to send data and a program command to instruct the NAND memory 104 to store data in a particular memory location in the NAND memory 104. The controller 106 is also configured to send a read command to the NAND memory 104 to read data from a particular memory location in the NAND memory 104.

The processor 122 is operatively connected to the various modules within the controller 106 and the data storage device 102. In some examples, software is loaded in a RAM of the memory 124 as computer executable instructions. Those computer executable instructions are capable of being retrieved from the memory 124 and executed by the processor 122 to control the operation of the controller 106 and perform the processes described herein. Alternatively, the software described herein may be loaded in dynamic random-access memory (DRAM) that is separate and distinct from, and external to, the data storage device 102

In some implementations, one or more modules of the controller 106 correspond to separate hardware components within the controller 106. In other implementations, one or more modules of the controller 106 correspond to software stored within the memory 124 and executed by the processor 122. The memory 124 is configured to store data used by the controller 106 during operation. In yet other implements, the computer executable instructions described herein with respect to the memory 124 may be external to the memory 124 or external to the data storage device 102. For example, the computer executable instructions described herein may be performed in part, or in whole, by the host device 108.

Additionally, in other examples, firmware with instructions similar to the software described herein may be loaded in a ROM as computer executable instructions. For example, the firmware may be loaded in the ROM of the memory 124 as computer executable instructions. Those computer executable instructions are capable of being retrieved from the ROM and executed by the processor 122 to control the operation of the controller 106 and perform the processes described herein. In these examples, the use of "software" herein may be replaced with "firmware."

When the plurality of dies 112A-112N are working in parallel, the total NAND execution of the plurality of dies 112A-112N is equal to the NAND execution time of one die. However, for a software overhead (the amount of time the processor 122 takes to process the computer readable instructions in the software stored in the memory 124), the total time of software overheads is equal to the time of software overhead on one die multiplied by the number of dies. When the number of dies is less (e.g., two dies as illustrated and described in FIG. 2 below), the software overheads for the next NAND operations may be hidden behind current NAND operations. Additionally, when the number of dies is greater (e.g., thirty-two dies as illustrated and described in FIG. 3 below) then the software overheads for the next NAND operations may still be hidden behind current NAND operations with large operation times. However, when the number of dies is greater, then the software overheads for the next NAND operations may not be hidden behind current NAND operations with fast operation times, for example, sense operations. The software overheads that cannot be hidden behind current NAND operations become a bottleneck and decrease performance.

Figure 2:
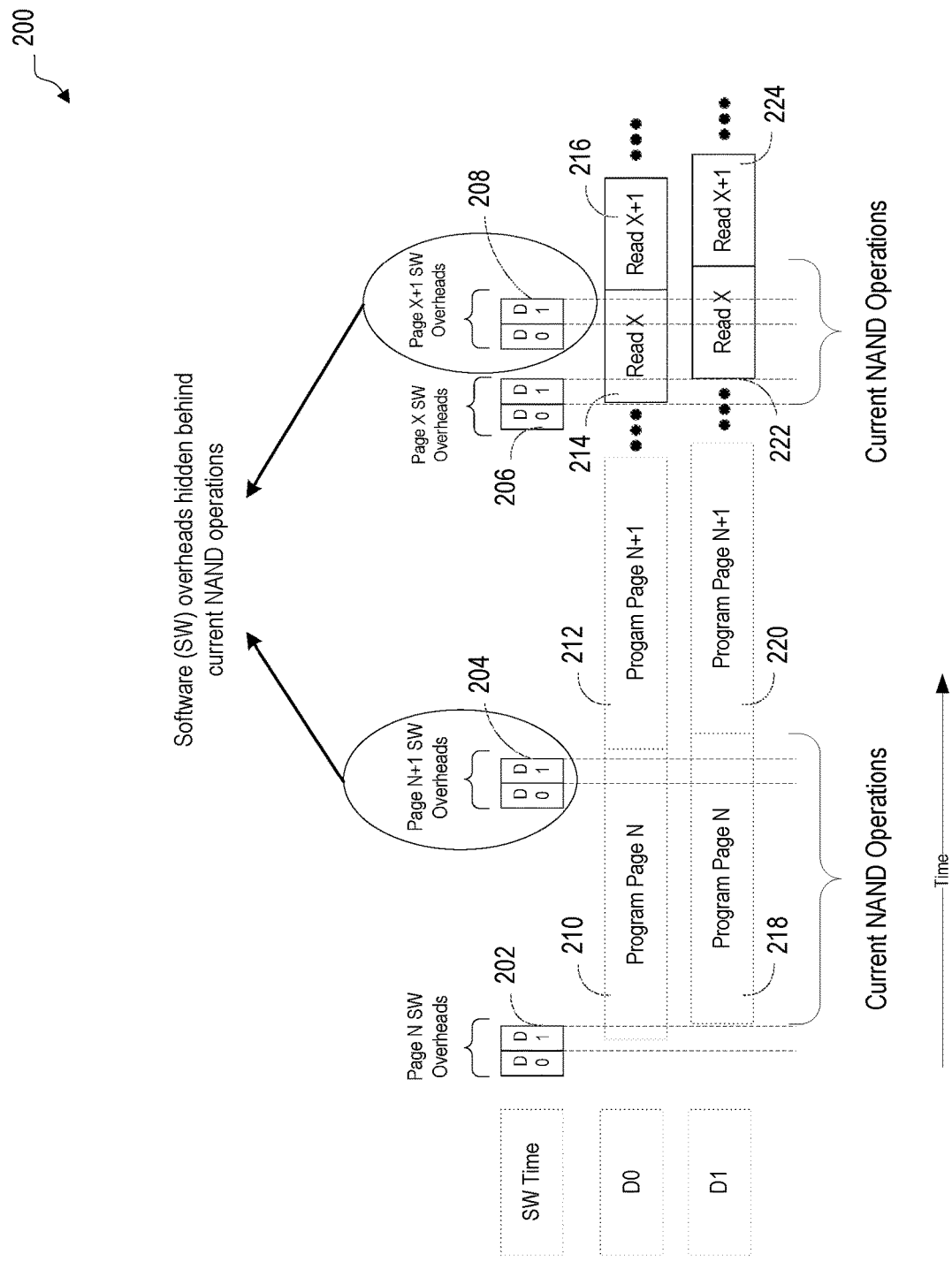
FIG. 2 is a timing diagram illustrating an example of software overheads that may be hidden behind current NAND operations.

FIG. 2 is a timing diagram illustrating an example 200 of software overheads 204 and 208 that may be hidden behind current NAND operations 210, 214, 218, and 222. In the example 200, the dies D0 and D1 are never idle because the software overheads 204 and 208 may be hidden behind current NAND operations 210, 214, 218, and 222.

As illustrated in FIG. 2, in the example 200, the software overhead 204 may be hidden behind the current NAND operations of Program Page N 210 in die D0 and Program Page N 218 in die D1. The current NAND operations of the Program Page N 210 in die D0 and the Program Page N 218 in die D1 is initiated by the processor 122 executing the software during the software overhead 202.

Similarly, in the example 200, the software overhead 208 may be hidden behind the current NAND operations of Read X 214 in die D0 and Read X 222 in die D1. The current NAND operations of the of Read X 214 in die D0 and the Read X 222 in die D1 is initiated by the processor 122 executing the software during the software overhead 206.

Figure 3:
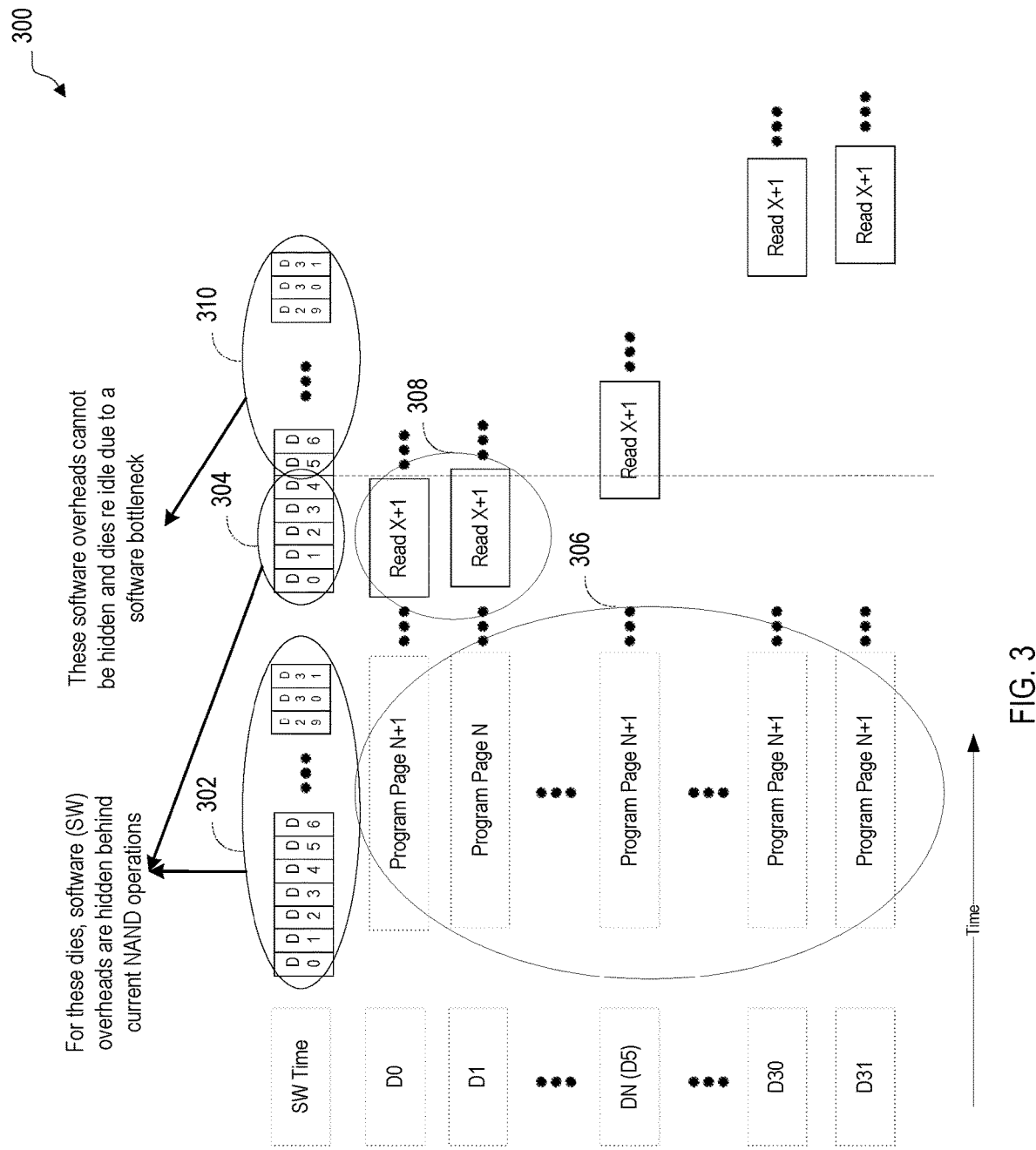
FIG. 3 is a timing diagram illustrating an example of software overheads that may be hidden behind current NAND operations and software overheads that form a software bottleneck.

FIG. 3 is a timing diagram illustrating an example 300 of software overheads 302 and 304 that may be hidden behind current NAND operations 306 and 308 and software overheads 310 that form a software bottleneck. In the example 300, the dies DN-D31 are idle because the software overheads 310 cannot be hidden behind current NAND operations.

As illustrated in FIG. 3, in the example 300, the software overheads 302 and 304 may be hidden behind the current NAND operations 306 and 308, respectively. The current NAND operations 306 are initiated by the processor 122 executing the software during the software overheads 302 and the current NAND operations 308 are initiated by the processor 122 executing the software during the software overheads 304.

However, in the example 300, the software overheads 310 cannot be hidden behind any current NAND operations because the software overheads 310 are either occurring at the same time or after dies DN-D31 (D5-D31 in the example 300) should be performing NAND operations (Read X+1 in the example 300). Consequently, the dies DN-D31 remain idle and the software overheads 310 represent a software bottleneck.

Figure 4:
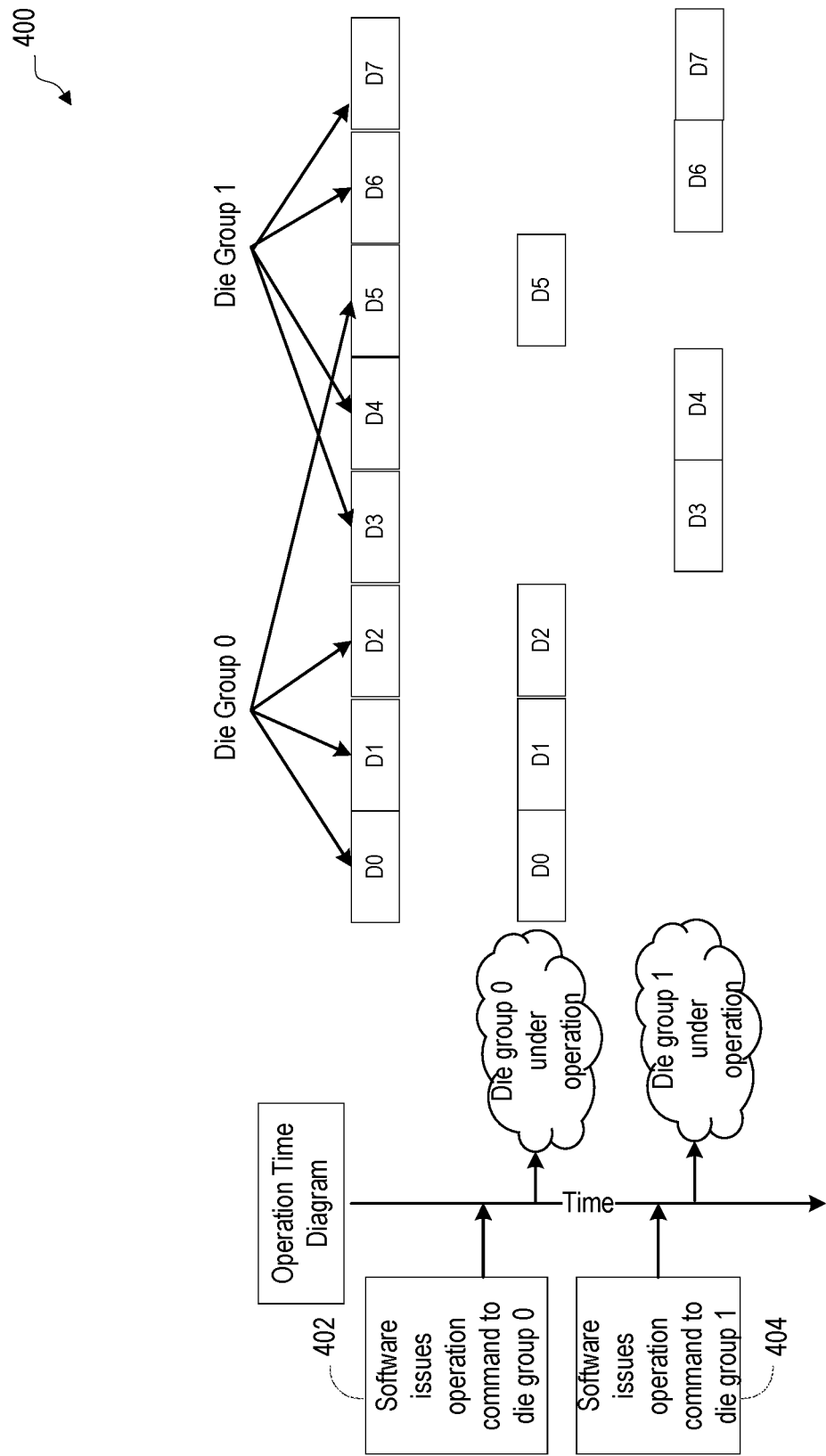
FIG. 4 is a timing diagram illustrating an example of software operating with two different die groups, in accordance with various aspects of the disclosure.

FIG. 4 is a timing diagram illustrating an example 400 of software operating with two different die groups 0 and 1 (also referred to herein as "logical groups"), in accordance with various aspects of the disclosure. As illustrated in FIG. 4, the software issues a multi-cast operation command to die group 0 (block 402) that is a first die group of a plurality of die groups. After the software issues the multi-cast operation command to die group 0, the software issues a second multi-cast operation command to die group 1 (block 404) that is a second die group of a plurality of die groups.

With dies grouped into logical groups that are operated together, the software addresses logical groups based on one or more indices. For example, the software may use multi-cast commands with a die group index (DGI) as a parameter.

When multi-cast commands are used with a specific index, corresponding dies within die groups are internally scheduled with a targeted operation. With a single command, the software may operate multiple dies. For example, a single read command may trigger a sense operation on multiple dies.

The change from unicast to multi-cast reduces the total software overhead. Specifically, a multi-cast command allows the total software overhead to be equal to the software overhead of a single die plus the sense time of the single die.

Figure 5:
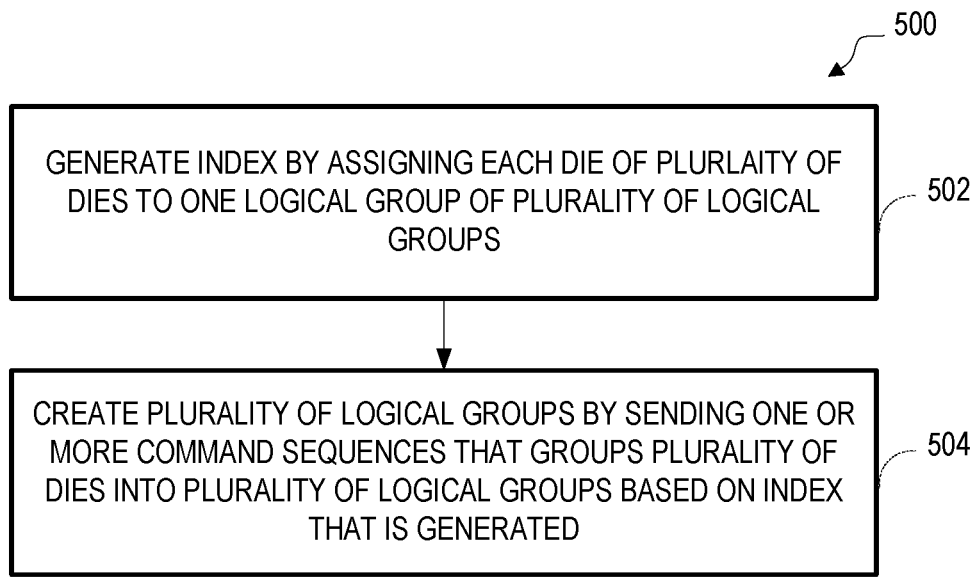
FIG. 5 is a flowchart illustrating a method for creating logical groups with an index, in accordance with various aspects of the disclosure.

However, the change from individual unicast commands to a multi-cast command requires the creation of logical groups in the first place. FIG. 5 is a flowchart illustrating a method 500 for creating logical groups with an index, in accordance with various aspects of the disclosure.

The method 500 includes generating an index by assigning each die of a plurality of dies to one logical group of a plurality of logical groups (at block 502). During the logical group creation, one group is assigned to each of the dies involved in logical group. The group assignment is done once (or a very limited number of times) as grouping of the dies is based on operational/health similarities among the dies and these parameters generally static.

The method 500 also includes creating the plurality of logical groups (e.g., in the NAND memory) by sending one or more command sequences that groups the plurality of dies into the plurality of logical groups based on the index (at block 504). In some examples, the one or more command sequences are one or more special sequences and may be specific to a restricted mode of the NAND mode (to limit scope of probable corruptions during normal operations like sense/program). The one or more special sequences that achieve group assignment may be different from regular sequences and have dedicated bytes to indicate logical group assignment has occurred. Also, in some examples, dedicated sequences may be available for entering/exiting the restricted mode of the NAND mode.

Figure 6:
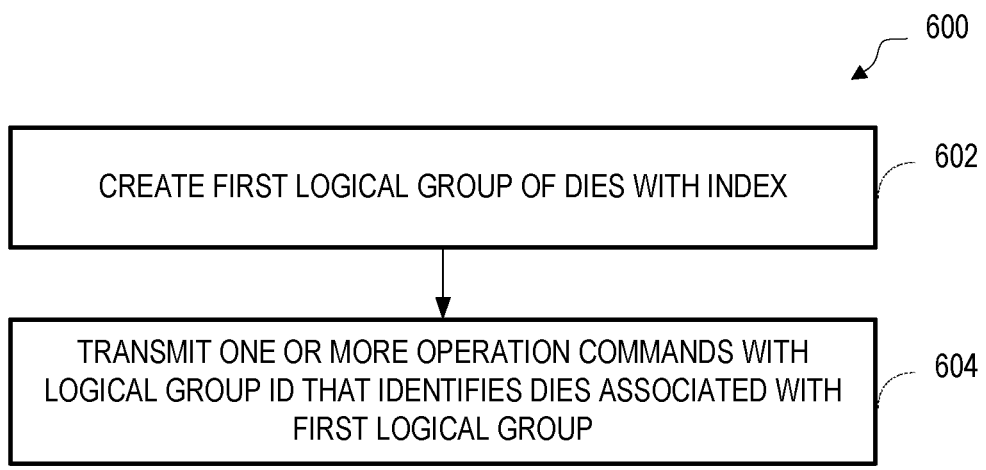
FIG. 6 is a flowchart illustrating a method for transmitting a multi-cast command to a logical group of dies, in accordance with various aspects of the disclosure.

FIG. 6 is a flowchart illustrating a method 600 for transmitting a multi-cast command to a logical group of dies, in accordance with various aspects of the disclosure. The method 600 includes creating a first logical group of dies with an index (at block 602). In some examples, the first logical group of dies is one logical group of a plurality of logical groups as described above and illustrated in FIGS. 4 and 5.

The method 600 also includes transmitting one or more operation commands with a logical group identifier (ID) to dies associated with a first logical group of the plurality of logical groups (at block 604). In some examples, the one or more operation commands are transmitted in a plurality of unicast commands with the logical group ID to form the multi-cast command. In other examples, the one or more operation commands are transmitted in a broadcast command with the logical group ID to form the multi-cast command.

Figure 7:
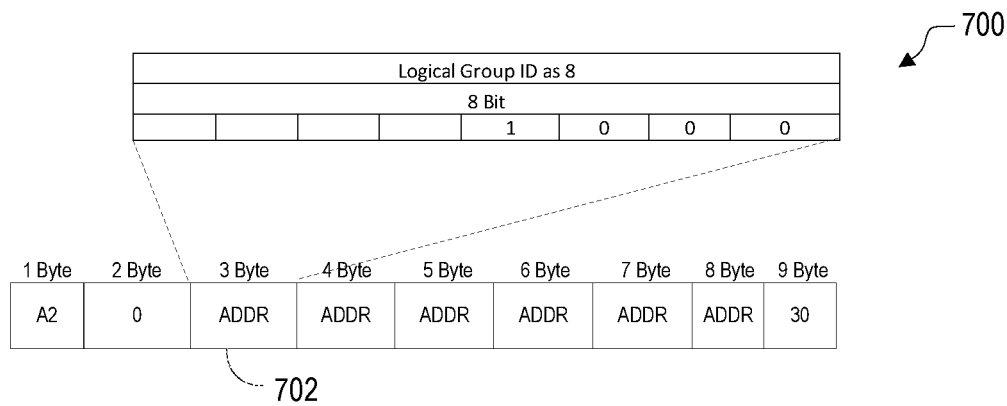
FIG. 7 is a block diagram illustrating a first example of a command sequence using an address extension of a first byte to select a logical group to perform an operation, in accordance with various aspects of the disclosure.

FIG. 7 is a block diagram illustrating a first example 700 of the command sequence using an address extension 702 of a first byte to select a logical group to perform an operation, in accordance with various aspects of the disclosure. In the first byte of the six byte address, the logical Group ID register of two or more dies may be represented. For example, the software may send the command sequence as two or more unicast commands using the address extension 702 of the third byte, which is the first byte of the six byte address, to select the two or more dies of a specific logical group to perform an operation. In some examples, as illustrated in FIG. 7, the address extension 702 is an eight-bit identifier that selects two or more dies assigned to logical Group 8 to perform an operation.

Figure 8:
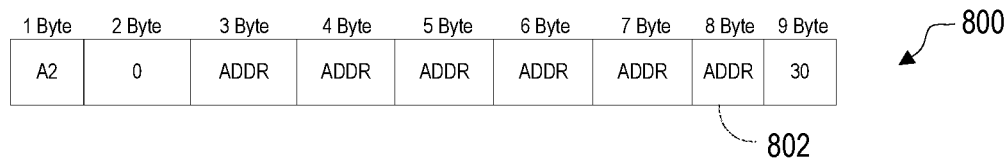
FIG. 8 is a block diagram illustrating a second example of a command sequence using an address extension of a last byte to select a logical group to perform an operation, in accordance with various aspects of the disclosure.

FIG. 8 is a block diagram illustrating a second example 800 of the command sequence using an address extension 802 of a last byte to select a logical group to perform an operation, in accordance with various aspects of the disclosure. In the last byte of the six byte address, the logical Group ID of two or more dies may be represented. For example, the software may send the command sequence as two or more unicast commands using the address extension 802 of the eighth byte, which is the last byte of the six byte address, to select two or more dies of a specific logical group to perform an operation. In some examples, the address extension 802 may be an eight-bit identifier that selects the two or more dies assigned to logical Group 8 to perform an operation and is similar to the eight-bit identifier in FIG. 7.

Further, in some examples, to enable a Legacy mode by switching back to individual unicast commands from the two or more unicast commands forming the multi-cast command, the software may include a null value (e.g., all zeroes) in the logical group ID. The null value may cause each die to automatically perform the operation included in the unicast command.

Additionally, in some examples, bytes other than the first byte and the last byte may be used to address and select one of the logical groups to perform an operation. As described above in FIGS. 7 and 8, the software may select logical groups by sending unicast commands to each of the dies with the first byte of the six byte address indicating the logical Group ID for each of the dies. However, the disclosure is not limited to the first byte and last byte examples of FIGS. 7 and 8, and includes all variations that may be used to address and select one of the logical groups to perform an operation, including a broadcast command with a logical Group ID to all dies.

Figure 9:
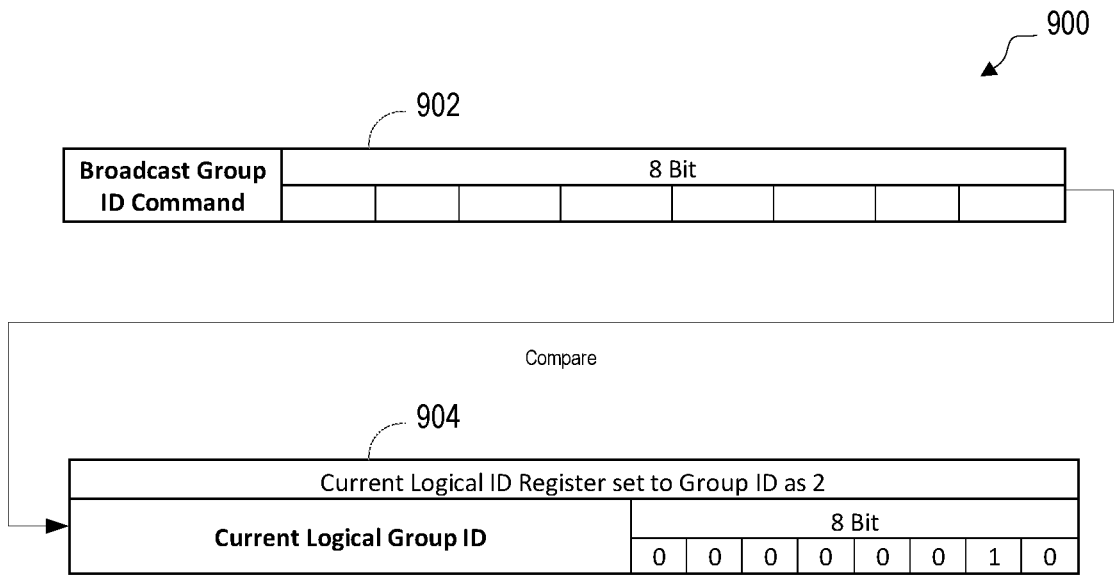
FIG. 9 is a block diagram illustrating an example of a command sequence using a broadcast command instead of unicast commands to select a logical group to perform an operation, in accordance with various aspects of the disclosure.

For example, FIG. 9 is a block diagram illustrating an example 900 of the command sequence using a broadcast command instead of the unicast commands to select a logical group to perform an operation, in accordance with various aspects of the disclosure. The software may first send a broadcast command 902 with a logical Group ID to all dies. After sending the broadcast command 902 to all dies, the broadcast command 902 may cause each die to compare the logical group ID of the broadcast command 902 to a current logical Group ID register 904 to determine whether the broadcast command 902 is intended for the each die. In some examples, the current logical Group ID register 904 may be an eight-bit identifier of two or more dies assigned to logical Group 2.

Further, in some examples, to enable a Legacy mode by switching back to individual unicast commands from multi-cast commands, the software may write a null value (e.g., all zeroes) to the current logical group ID register 904. For example, the software may issue a broadcast command to all dies that writes a null value in the current logical group ID register. Alternatively, the software may issue a unicast command to each die that writes a null value in the current logical group ID register. The null value may cause each die to automatically perform the operation included in the broadcast command.

Figure 10:
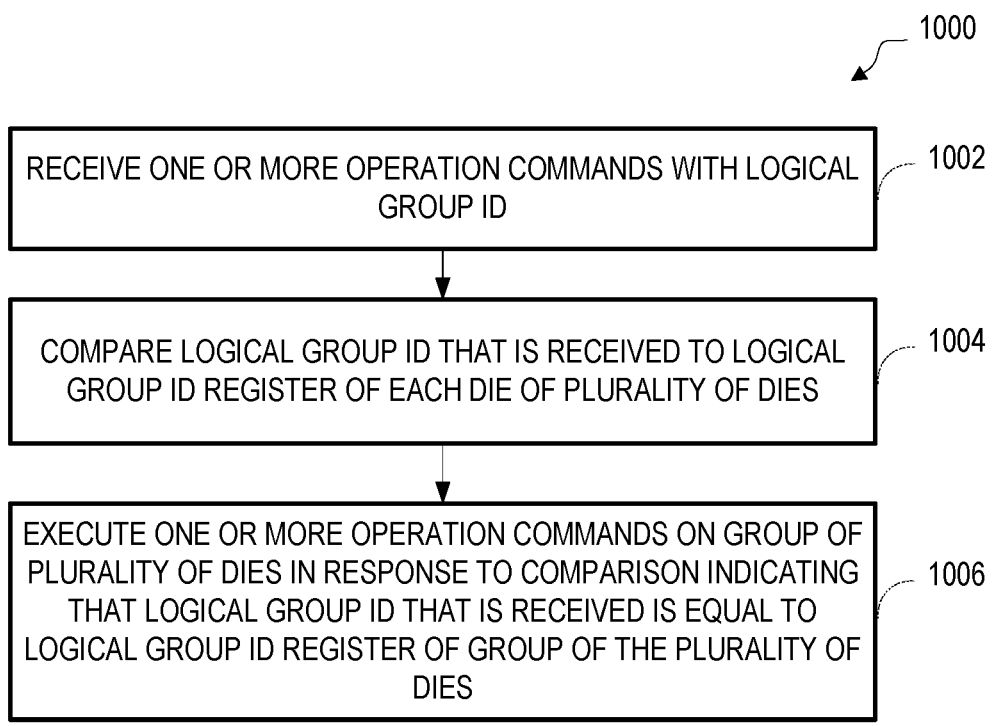
FIG. 10 is a flowchart illustrating a method for receiving a multi-cast command, in accordance with various aspects of the disclosure.

FIG. 10 is a flowchart illustrating a method 1000 for receiving a multi-cast command, in accordance with various aspects of the disclosure. The method 1000 includes receiving one or more operation commands with a logical Group ID (at block 1002). For example, the read/write circuit 114 receives the one or more operation commands with the logical Group ID via the I/O bus 116.

The method 1000 includes comparing the logical Group ID that is received to a Logical Group ID register of each die of a plurality of dies (at block 1004). For example, the read/write circuit 114 compares the logical Group ID that is received to a Logical Group ID register of each die of the plurality of dies 112A-112N.

The method 1000 includes executing the one or more operation commands on a group of the plurality of dies in response to the comparison indicating that the logical group ID that is received is equal to the logical group ID register of the group of the plurality of dies (at block 1006). For example, the read/write circuit 114 executes the one or more operation commands on a group of the plurality of dies 112A-112N in response to the comparison indicating that the logical group ID that is received is equal to the logical group ID register of the group of the plurality of dies 112A-112N. In some examples, the group of the plurality of dies 112A-112N is less than all of the plurality of dies 112A-112N.

In some examples, when the logical Group ID is equal, then a flag is set to indicate all of the associated commands are addressed to the die. Additionally, in these examples, when the logical Group ID is not equal, then a flag is reset to indicate all of the associated commands are not addressed to the die.

The storage devices, methods, and apparatuses of the present disclosure described above provide a quantifiable performance gain. After data is programmed to NAND, data is read back to check data integrity in NAND (Enhanced post write read (EPWR)). Only after data integrity is confirmed, Logical to Physical (L2P) mapping will be updated. If such integrity fails, an appropriate data recovery scheme will be performed.

The EPWR operation time advantage for sixteen dies may have a performance gain of approximately 8.4 percent. Instead of sixteen software overheads, each for a die, only one multi-cast software overhead is required which gets hidden behind the sense operation. Assuming, for example, there are sixteen dies, the program time per triple-level cell (TLC) page is 1.8 milliseconds (ms), and the number of pages is equal to three-hundred and eighty-four (i.e., four strings multiplied by ninety-six word lines), then the total program time of sixteen dies in parallel is equal to three-hundred and eighty-four multiplied by 1.8 ms, which is equal to 691.2 ms.

Considering the number of EPWR operations (assuming one Flash Management Unit (FMU) per page) is equal to three-hundred and eighty-four multiplied by three (i.e., one sense per L, M, U), then the number of EPWR operations is one-thousand one-hundred and fifty two sense operations. The FMU per page may also be interpreted as an ECC page or, in general, a minimum unit of data that the storage system encodes-decodes to ensure data integrity/error correction mechanisms. Assuming, for example, the average sense time per die is equal to sixty microseconds ($\mu s$), then the total sense time of sixteen dies in parallel is equal to one-thousand one-hundred and fifty two sense operations multiplied by the sixty microseconds, which is equal to 69.12 ms.

Assuming, for example, the software overhead for a sense operation is equal to seven microseconds, then the total software overheads for EPWR operations per die is equal to one-thousand one-hundred and fifty two sense operations multiplied by the seven microseconds of the software overhead for the sense operation, which is equal to 8.064 ms.

Assuming, for example, the number of sense software overheads that can be hidden behind NAND sense operations is equal to the average sense time per die divided by the software overhead for a sense operation (i.e., 60 $\mu s$/7 $\mu s$), then the number of sense software overheads that can be hidden behind NAND sense operations is equal to eight dies.

Therefore, the software overheads for the remaining eight dies would be in foreground without the present disclosure.

In view of the foregoing, the total number of software overheads for EPWR operations for all dies in the foreground may be reduced to zero dies from eight dies. This reduction is equal to a reduction in the total software overheads for EPWR operations per die multiplied by the number of dies in the foreground (i.e., 8.064 multiplied by 8), which in this case is a reduction of sixty-four ms. Therefore, the percentage of the performance gain is equal to the above reduction (i.e., sixty-four ms) divided by the total program time of sixteen dies in parallel and the total sense time of sixteen dies in parallel (i.e., 64/(691.2+69.12)), which is equal to 8.4 percent.

With regard to the devices, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
a NAND memory including a plurality of dies; and
a controller coupled to the NAND memory and configured to:
generate an index by assigning each die of the plurality of dies to one logical group of a plurality of logical groups, and
create the plurality of logical groups in the NAND memory by sending one or more command sequences to the NAND memory that groups the plurality of dies into the plurality of logical groups based on the index that is generated,
wherein a first two or more dies of the plurality of dies are assigned to a first logical group of the plurality of logical groups based on a first die characteristic shared across all of the plurality of dies,
wherein a second two or more dies of the plurality of dies are assigned to a second logical group of the plurality of logical groups based on a second die characteristic shared across all of the plurality of dies, and
wherein the first logical group is distinct from the second logical group.

2. The data storage device of claim 1, wherein the controller is further configured to:
transmit one or more operation commands with a logical group identifier (ID) that addresses the first logical group of the plurality of logical groups.

3. The data storage device of claim 2, wherein the one or more operation commands with the logical group ID is a multi-cast command to the first logical group.

4. The data storage device of claim 2, wherein the controller is further configured to:
transmit a second one or more operation commands with a second logical group identifier (ID) that addresses the second logical group of the plurality of logical groups.

5. The data storage device of claim 4, wherein the NAND memory further includes a read/write circuit configured to perform the one or more operation commands, and wherein the controller is further configured to transmit the second one or more operation commands while the read/write circuit is performing the one or more operation commands.

6. The data storage device of claim 1, wherein the NAND memory further includes a read/write circuit configured to:
receive one or more operation commands with a logical group identifier (ID) that addresses a single logical group of the plurality of logical groups,
compare the logical group ID that is received to a logical group identifier (ID) register of each of the plurality of dies, and
execute the one or more operation commands on the first logical group of the plurality of dies in response to the comparison indicating that the logical group ID that is received is equal to the logical group ID register of the first logical group of the plurality of dies.

7. The data storage device of claim 1, wherein the one or more command sequences include address extensions with different logical group identifiers (IDs), wherein the NAND memory further includes a read/write circuit configured to:
store a first logical group identifier (ID) of the different logical group IDs in logical group identifier (ID) registers of the first two or more dies to create the first logical group, and
store a second logical group identifier (ID) of the different logical group IDs in logical group identifier (ID) registers of the second two or more dies to create the second logical group,
wherein the first logical group ID and the second logical group ID are each a single identifier.

8. The data storage device of claim 1, wherein the one or more command sequences include a broadcast command, wherein the NAND memory further includes a read/write circuit configured to:
  receive the broadcast command,
  receive a logical group identifier (ID) for the each die of the plurality of dies, and
  store the logical group ID for the each die of the plurality of dies in a logical group ID register of the each die in response to receiving the broadcast command and the logical group identifier for the each die of the plurality of dies.

9. A method comprising:
  generating, with a controller, an index by assigning each die of a plurality of dies of a NAND memory to one logical group of a plurality of logical groups; and
  creating, with the controller, the plurality of logical groups in the NAND memory by sending one or more command sequences to the NAND memory that groups the plurality of dies into the plurality of logical groups based on the index that is generated,
  wherein a first two or more dies of the plurality of dies are assigned to a first logical group of the plurality of logical groups based on a first die characteristic shared across all of the plurality of dies,
  wherein a second two or more dies of the plurality of dies are assigned to a second logical group of the plurality of logical groups based on a second die characteristic shared across all of the plurality of dies, and
  wherein the first logical group is distinct from the second logical group.

10. The method of claim 9, further comprising:
  transmitting one or more operation commands with a logical group identifier (ID) that addresses the first logical group of the plurality of logical groups.

11. The method of claim 10, wherein the one or more operation commands with the logical group ID is a multicast command to the first logical group.

12. The method of claim 10, further comprising:
  transmitting a second one or more operation commands with a second logical group identifier (ID) that addresses the second logical group of the plurality of logical groups.

13. The method of claim 12, further comprising:
  performing one or more operations on the NAND memory based on the one or more operation commands,
  wherein transmitting the second one or more operation commands further includes transmitting the second one or more operation commands while a read/write circuit is performing the one or more operation commands on the NAND memory.

14. The method of claim 9, further comprising:
  receiving one or more operation commands with a logical group identifier (ID) that addresses a single logical group of the plurality of logical groups;
  comparing the logical group ID that is received to a logical group identifier (ID) register of each of the plurality of dies; and
  executing the one or more operation commands on a first group of the plurality of dies in response to the comparison indicating that the logical group ID that is received is equal to the logical group ID register of the first group of the plurality of dies.

15. The method of claim 9, wherein the one or more command sequences include address extensions with different logical group identifiers (IDs), the method further comprising:
  storing a first logical group identifier (ID) of the different logical group IDs in logical group identifier (ID) registers of the first two or more dies to create the first logical group and
  storing a second logical group identifier (ID) of the different logical group IDs in logical group identifier (ID) registers of the second two or more dies to create the second logical group,
  wherein the first logical group ID and the second logical group ID are each a single identifier.

16. The method of claim 9, wherein the one or more command sequences include a broadcast command, the method further comprising:
  receiving the broadcast command;
  receiving a logical group identifier (ID) for the each die of the plurality of dies; and
  storing the logical group ID for the each die of the plurality of dies in a logical group identifier (ID) register of the each die in response to receiving the broadcast command and the logical group identifier for the each die of the plurality of dies.

17. An apparatus comprising:
  means for generating an index by assigning each die of a plurality of dies of a NAND memory to one logical group of a plurality of logical groups; and
  means for creating the plurality of logical groups in the NAND memory by sending one or more command sequences to the NAND memory that groups the plurality of dies into the plurality of logical groups based on the index that is generated,
  wherein a first two or more dies of the plurality of dies are assigned to a first logical group of the plurality of logical groups based on a first die characteristic shared across all of the plurality of dies,
  wherein a second two or more dies of the plurality of dies are assigned to a second logical group of the plurality of logical groups based on a second die characteristic shared across all of the plurality of dies, and
  wherein the first logical group is distinct from the second logical group.

18. The apparatus of claim 17, further comprising:
  means for transmitting one or more operation commands with a logical group identifier (ID) that addresses the first logical group of the plurality of logical groups.

19. The apparatus of claim 18, further comprising:
  means for transmitting a second one or more operation commands with a second logical group identifier (ID) that addresses the second logical group of the plurality of logical groups.

20. The apparatus of claim 19, further comprising:
  means for performing one or more operations on the NAND memory based on the one or more operation commands,
  wherein the means for transmitting the second one or more operation commands further includes means for transmitting the second one or more operation commands while a read/write circuit is performing the one or more operation commands on the NAND memory.

* * * * *